No. 795,862. PATENTED AUG. 1, 1905.
C. S. SCHULTZ.
POWER TRANSMISSION IN SELF PROPELLED VEHICLES OR VESSELS.
APPLICATION FILED JAN. 15, 1904.
4 SHEETS—SHEET 4.
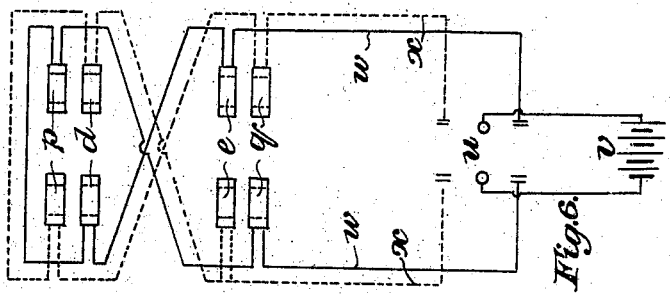
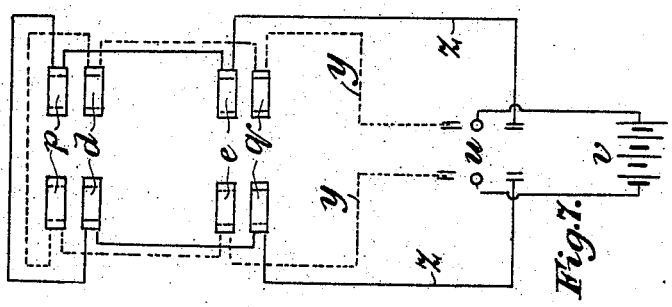
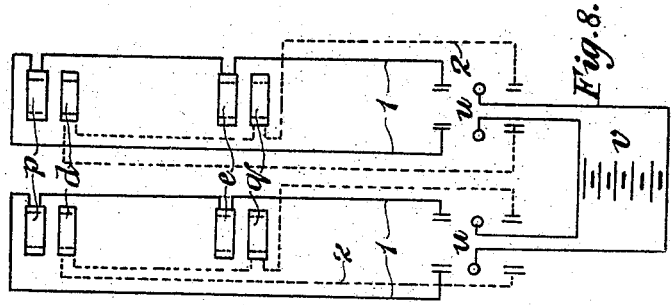
ATTEST.
INVENTOR
CHARLES S. SCHULTZ
BY Ellis Spear & Company
ATTYS

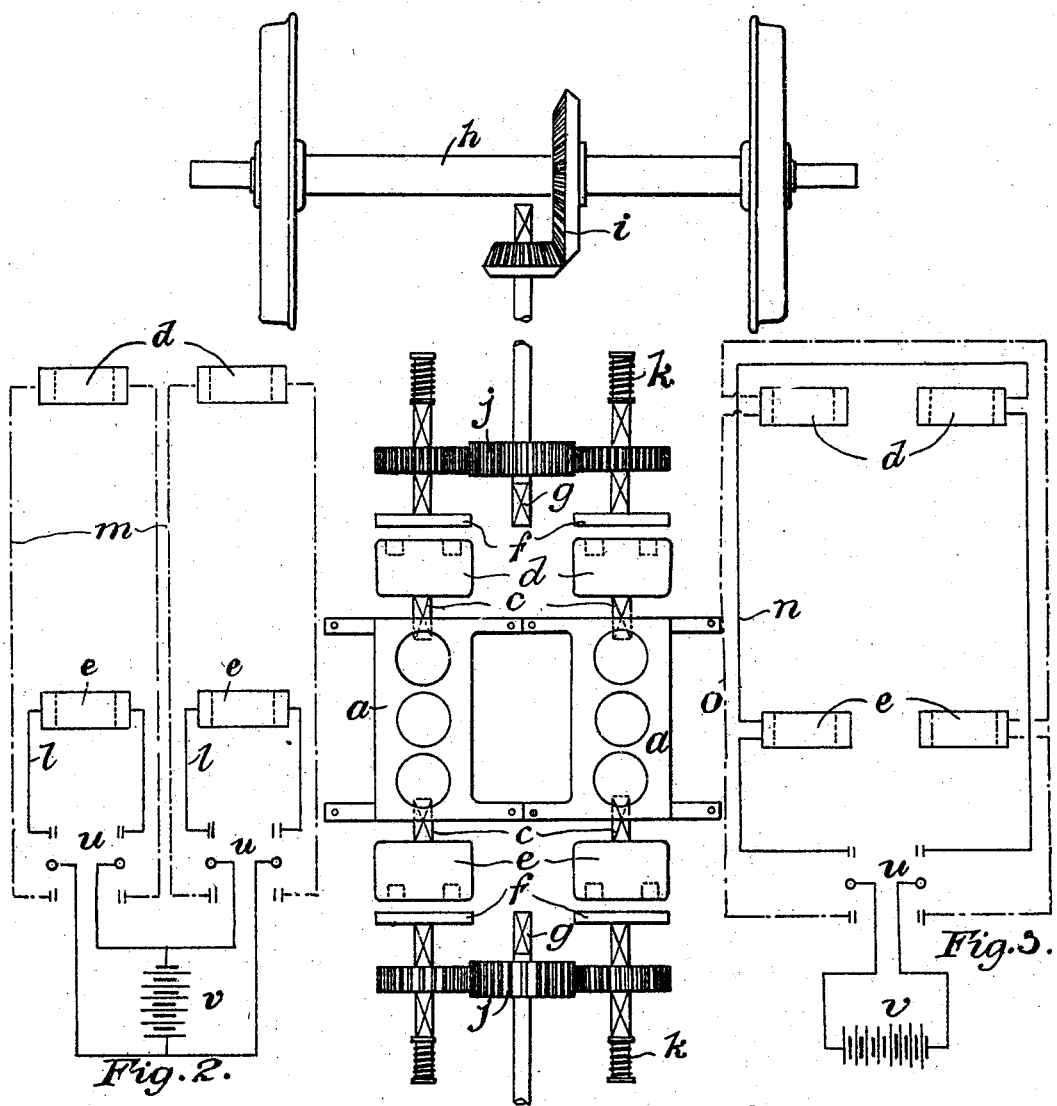

UNITED STATES PATENT OFFICE.

CHARLES STAFFORD SCHULTZ, OF LONDON, ENGLAND.

POWER TRANSMISSION IN SELF-PROPELLED VEHICLES OR VESSELS.

No. 795,862. Specification of Letters Patent. Patented Aug. 1, 1905.

Application filed January 15, 1904. Serial No. 189,207.

*To all whom it may concern:*

Be it known that I, CHARLES STAFFORD SCHULTZ, a subject of the King of Great Britain and Ireland, residing at Abchurch Yard, Cannon street, in the city of London, England, have invented certain new and useful Improvements in and Relating to Power Transmission in Self-Propelled Vehicles or Vessels, (for which I have made application for Letters Patent in Great Britain, No. 23,958, dated the 4th day of November, 1903,) of which the following is a specification.

This invention relates to power transmission in self-propelled vehicles or vessels which may be used for traction purposes.

In applying internal-combustion engines to motor-vehicles for roads, and especially where great tractive efforts have to be employed, as in the case of passenger-vehicles on railways and also those intended for traction purposes, considerable difficulties occur; and the invention has for its object an improved engine arrangement and transmission-gear whereby great tractive efforts may be obtained by driving on either or both sets of the driving-wheels in such a way as to permit also of simple reversal in the direction of travel of the vehicle without reversing the direction of rotation of the motor-shafts or introducing an intermediate gear.

Another object of the invention is to effect a simple transmission in launches or other vessels.

The first part of the invention consists in employing two shafts propelled by one or more internal-combustion or other motors, these shafts being coupled by clutches directly or indirectly to the propelling means, such as propellers or driving-wheels, in such a way as to effect two independent drives of the vehicle or vessel, the clutches being arranged to operate in pairs, one pair at a time, so as to effect reversal of the direction of propulsion without change of the direction of running of the motor or motors.

The second part of my invention consists in electrically controlling the clutches, which may be of any suitable type, in such a way that the right pair of clutches is simultaneously brought into operation and the idle pair held in the off position.

The invention will now be described with reference to the accompanying drawings, which illustrate several modifications of the invention adapted to a motor-driven vehicle.

Figure 4:
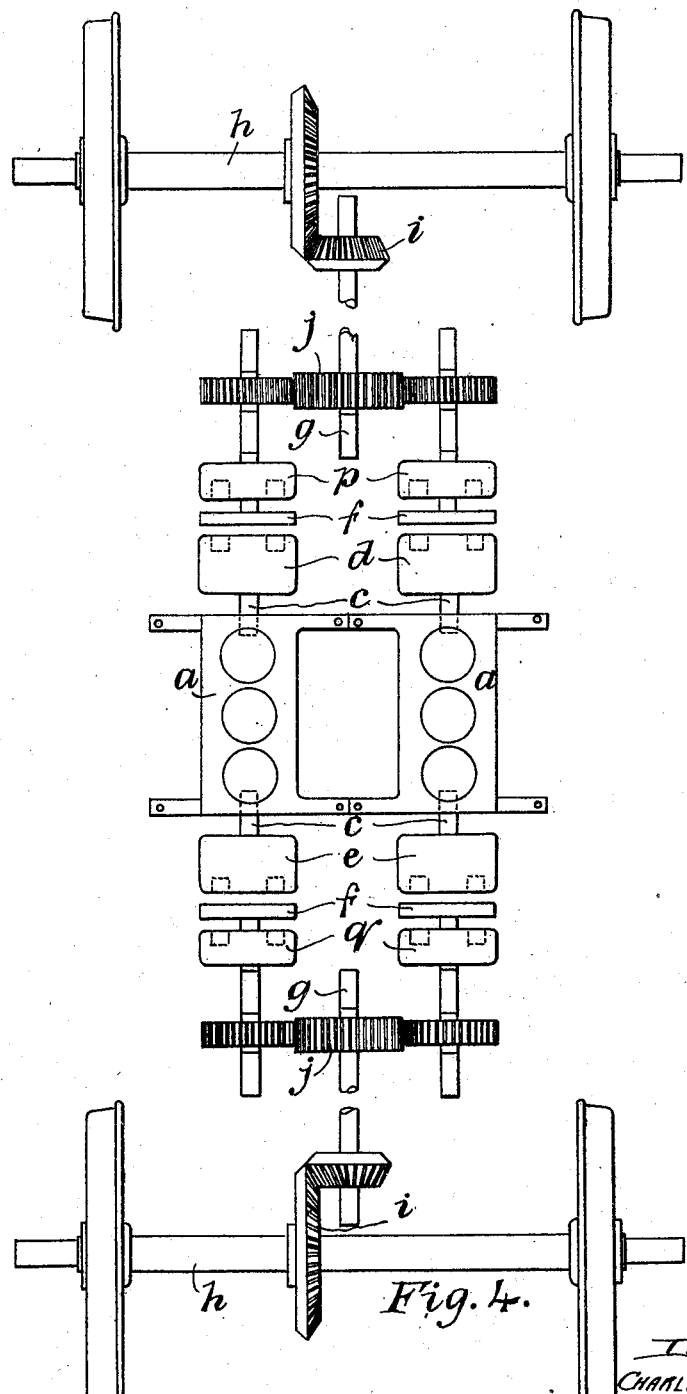
Figure 5:
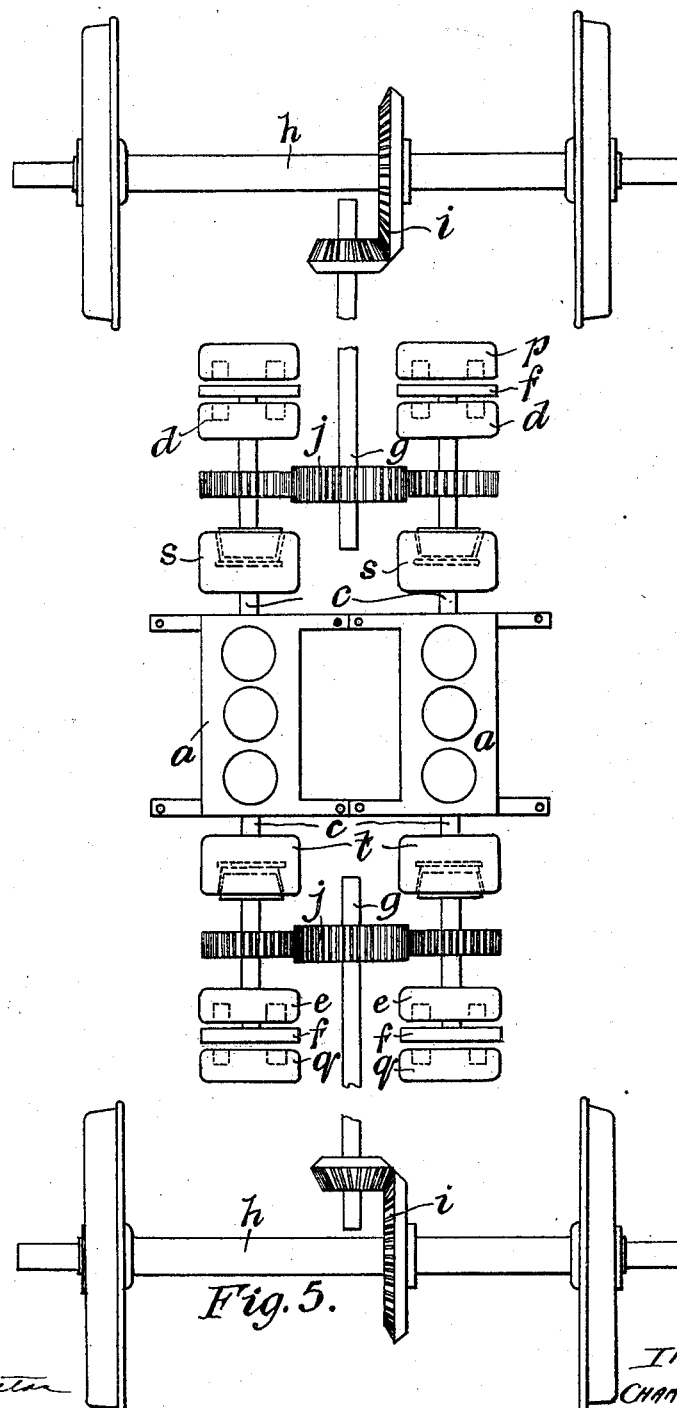

Figure 1 is a diagrammatic plan illustrating one modification wherein the motor-shafts are connected when required to the respective driving-shafts by means of magnetic clutches, the latter being disconnected by springs. Figs. 2 and 3 are diagrams of the electrical connections for the clutches shown in Fig. 1. Fig. 4 is a diagrammatic plan illustrating another modification wherein electromagnetic clutches are employed for connecting and electromagnets for disconnecting. Fig. 5 illustrates a similar arrangement to that shown in Fig. 4, but one in which ordinary friction-clutches are employed actuated by electromagnets. Figs. 6, 7, and 8 are diagrams of electrical connections suitable for the arrangements shown in Figs. 4 and 5.

In carrying out the invention according to one modification two internal-combustion engines $a\ a$, Fig. 1, rotating in opposite directions, are employed. The oppositely-rotating shafts may conveniently be obtained by oppositely disposing two similar engines rotating in the same direction, so that clockwise and counter-clockwise rotation is secured. The engines are mounted parallel with one another and have their shafts $c$ disposed longitudinally on the body or frame of the vehicle, and a clutch $d$ is provided on one end of each engine-shaft $c$ and a clutch $e$ on the other end of each engine-shaft, the clutches being adapted, by means of disks $f\ f$, to connect each shaft to two main driving-shafts $g\ g$ through suitable gearing $j$. The shafts $g\ g$ drive the vehicle-axles $h\ h$ through bevel or other suitable gearing $i$. Each of the clutch-disks $f$ is normally held out of gear by means of springs $k$ or other equivalent devices. The clutches are of a magnetic type, and the parts $d\ e$, which may also serve the purpose of fly-wheels, are each provided with a suitable winding, forming a magnetic field, which when energized from a suitable source attracts an armature $f$, which latter in this case consists of the driven half of the clutch. The clutches are controlled electrically, and the two arrangements of circuits (see Figs. 2 and 3) may be employed for operating the system of power transmission shown. By means of the arrangement of circuit shown in Fig. 2 the forward clutch $d$ on one engine and the rear clutch $e$ on the other engine are adapted to be independently brought into circuit with the battery or generator $v$ by means of the independent switches $u$ through the circuits $m\ l$, respectively, each engine thus driving one of the vehicle or propeller shafts $h$. This arrangement also permits one of the engines to be thrown out of gear, should it be necessary, from breakdown or otherwise. In Fig. 3 the respective clutches are adapted to be simultaneously operated in pairs by means of one switch $u$ through the circuits $n$ or $o$. A backward or forward propulsion of the vehicle or vessel will be obtained according to which of the circuits $n$ or $o$ is completed.

Referring to Fig. 4, a similar arrangement of power transmission is here shown, with the difference that the clutches are disconnected, as well as connected, electrically. The clutch-disks $f$ may be connected with the driving clutch portions $d$ $e$ or may be disconnected therefrom by magnetic disks $p$ $q$, respectively.

Referring to Fig. 5, mechanically-operated friction-clutches $s$ $t$ are interposed on each engine-shaft between the engine and operating electromagnets $d$ $e$. The magnets $d$ $e$ $p$ $q$ when energized act directly through armature $f$ on the male portions of the friction-clutches $s$ $t$ for connecting and disconnecting.

To operate the systems of gearing shown in Figs. 4 and 5, the arrangement of circuits indicated in Fig. 6 may be used, the engines $a$ rotating in opposite directions. When the circuit $w$ is made by means of the switch $u$, the forward shaft of one engine and the rear shaft of the other are simultaneously brought into gear with the forward and rear vehicle and propeller axles, respectively, and the two other clutches are electrically disconnected. To reverse the direction of motion, the circuit $x$, shown in dotted lines, is used. Fig. 7 shows an alternative diagram for effecting a similar object, the circuits $y$ $z$ being used.

The diagram shown in Fig. 8 shows two switches $u$, adapted to be independently operated. The forward clutch $d$ on one engine and the rear clutch $e$ on the other engine are independently brought into circuit with the battery or generator $v$ by means of the independent switches $u$, and the other clutches are electrically disconnected through the circuits 1 and 2, respectively.

The disconnecting magnetic disks $p$ $q$ are preferably constructed with a winding of a smaller number of turns than the power-transmitting magnetic disks $d$ $e$.

It will be easily understood that the above-described system of power transmission may be applied to marine purposes. In such a case the two engines might be disposed across the length of the vessel, the two axles $h$ forming the propeller-shafts, while the clutches would be mounted as before.

Having now particularly described and ascertained the nature of my said invention and in what manner the same is to be performed, I declare that what I claim is—

1. A motor vehicle or vessel having respectively two drive or propeller shafts, and having two motor-shafts running in opposite directions and transmitting connections including clutches extending from the said motor-shafts whereby either forward or rearward propulsion to both drive or propeller shafts simultaneously may be effected through the simultaneous transmission of power from both motors, substantially as described.

2. A motor vehicle or vessel having two motor-shafts and connections from the ends of each motor-shaft to the front and rear drive or propeller shafts respectively, including clutches and means for operating the said clutches, substantially as described.

3. A motor vehicle or vessel, having two motor-shafts running in opposite directions, and connections from the ends of each motor-shaft to the front and rear drive or propeller shafts respectively, including clutches, substantially as described.

4. A motor vehicle or vessel, having two motor-shafts and connections from the ends of each motor-shaft to the front and rear drive or propeller shafts respectively, including clutches and electrical means for operating the clutches, substantially as described.

5. A system of power transmission for motor-driven vehicles or vessels, comprising two motor-driven shafts, each moving constantly in one direction but relatively in opposite directions, driving-wheel shafts or propeller-shafts, clutches for coupling the motor-driven shafts with the driving-wheel shafts and means whereby the clutches may be operated in pairs, to drive the vehicle either forward or backward without changing the direction of rotation of the motor-driven shafts, substantially as described.

6. In a system of power transmission for motor-driven vehicles or vessels, the combination of two motor-driven shafts, driving-wheel shafts or propeller-shafts, clutches to couple the motor-driven shafts with the driving-wheel shafts or propeller-shafts, said clutches being operated in pairs, and comprising clutch-windings and withdrawal windings, electrical connections including the clutch-winding on the rear end of one engine-shaft, the clutch-winding on the forward end of the other engine-shaft, the withdrawal winding on the rear end of the second engine and the withdrawal winding on the forward end of the first engine, substantially as described.

In witness whereof I have hereunto set my hand in presence of two witnesses.

CHARLES STAFFORD SCHULTZ.

Witnesses:
 ALBERT E. PARKER,
 FRANCIS J. BIGNELL.